US005799180A

United States Patent [19]

Shiell et al.

[11] Patent Number: 5,799,180
[45] Date of Patent: Aug. 25, 1998

[54] MICROPROCESSOR CIRCUITS, SYSTEMS, AND METHODS PASSING INTERMEDIATE INSTRUCTIONS BETWEEN A SHORT FORWARD CONDITIONAL BRANCH INSTRUCTION AND TARGET INSTRUCTION THROUGH PIPELINE, THEN SUPPRESSING RESULTS IF BRANCH TAKEN

[75] Inventors: Jonathan H. Shiell; James Oliver Bondi, both of Plano, Tex.

[73] Assignee: Texas Instruments Incorporated, Dallas, Tex.

[21] Appl. No.: 741,242

[22] Filed: Oct. 30, 1996

Related U.S. Application Data

[60] Provisional application No. 60/008,166, Oct. 31, 1995.
[51] Int. Cl.⁶ ........................................... G06F 9/38
[52] U.S. Cl. ..................... 395/581; 395/394; 395/395; 395/800.23
[58] Field of Search ........................ 395/395, 394, 395/581, 800.23

[56] References Cited

U.S. PATENT DOCUMENTS 5,051,896  9/1991  Lee et al. ............................ 395/567
5,606,676  2/1997  Grochowski et al. ................ 395/586
5,623,615  4/1997  Salem et al. ......................... 395/585
5,634,103  5/1997  Dietz et al. .......................... 395/582

*Primary Examiner*—Kenneth S. Kim
*Attorney, Agent, or Firm*—Robert D. Marshall, Jr.; James C. Kesterson; Richard L. Donaldson

[57] ABSTRACT

Circuits, systems, and methods relating to processor which processes a plurality of sequentially arranged instructions. In the method, one method step (10) receives into a processor pipeline an instruction from the plurality of sequentially arranged instructions. Another step (12) determines whether the received instruction comprises a short forward branch instruction. If the received instruction comprises a short forward branch instruction, the method (14) issues a detection signal and (16) issues a condition signal representing whether or not the condition of the short forward branch instruction is satisfied. Continuing, the method (18) receives into the processor pipeline a first group of instructions of the plurality of sequentially arranged instructions, where each is between the short forward branch instruction and the target instruction. Each such instruction passes fully through the processor pipeline and the method (26) suppresses its result in response to the detection signal if the condition signal represents that the condition of the short forward branch is satisfied.

34 Claims, 4 Drawing Sheets

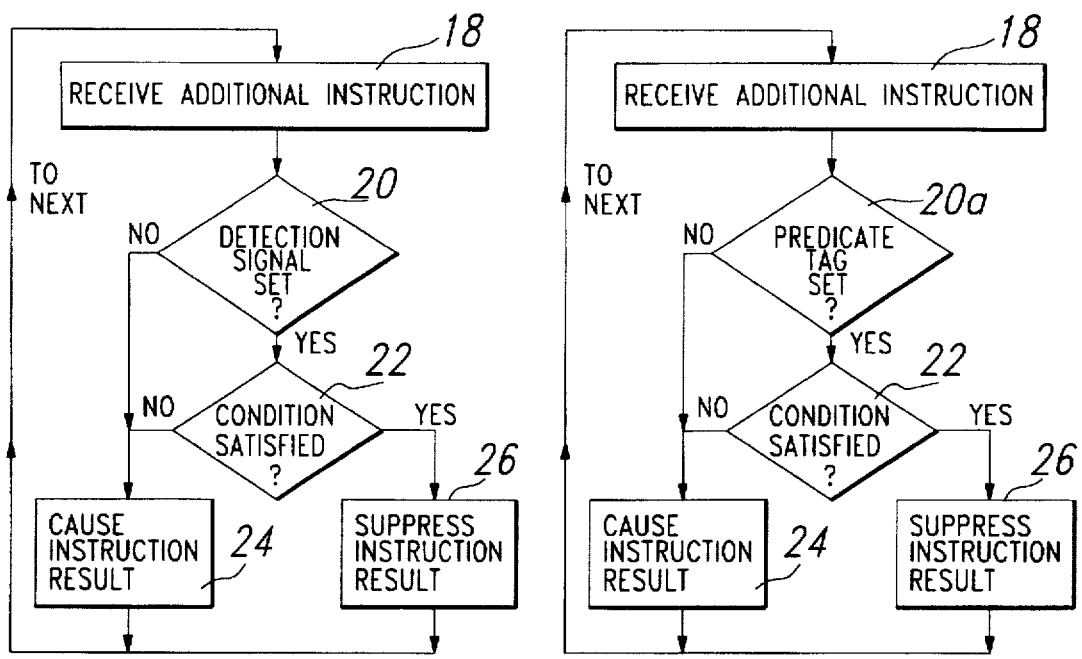
Fig.2    Fig.2a
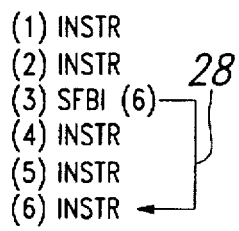
Fig.3
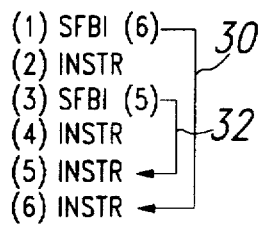    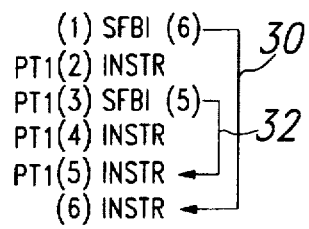    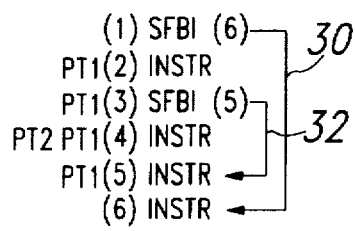
Fig.4a    Fig.4b    Fig.4c
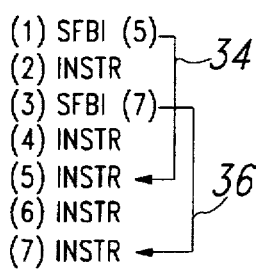    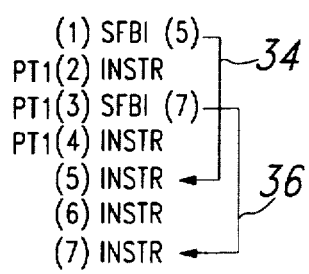    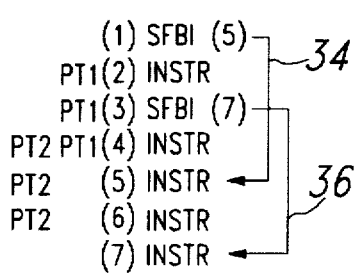
Fig.5a    Fig.5b    Fig.5c

5,799,180

MICROPROCESSOR CIRCUITS, SYSTEMS, AND METHODS PASSING INTERMEDIATE INSTRUCTIONS BETWEEN A SHORT FORWARD CONDITIONAL BRANCH INSTRUCTION AND TARGET INSTRUCTION THROUGH PIPELINE, THEN SUPPRESSING RESULTS IF BRANCH TAKEN

This application claims priority under 35 USC 119(e) (1) of the provisional application Ser. No. 60/008,166, filed Oct. 31, 1995.

This invention relates to microprocessors, and is more particularly directed to a microprocessor with improved branch instruction execution circuits, systems, and methods.

BACKGROUND OF THE INVENTION

The embodiments described below involve the developing and ever-expanding field of computer systems and microprocessors. Microprocessors operating in a pure sequential order are now being surpassed by so-called "superscalar" microprocessors which can perform more than one instruction execution at a time. Naturally, the ability to execute more than one instruction at a time provides vast increases in processor speed and, therefore, is highly desirable. Nevertheless, the switch from single instruction execution to multiple instruction execution gives rise to countless design complexities.

Certain design complexities arise from considerations of branch instructions, that is, those instructions which direct program control away from the otherwise sequential operation established by sequentially oriented software. Various techniques are now in the art to handle certain branch complexities, such as those which predict the likelihood that the condition of a branch will or will not be satisfied (sometimes referred to as "taken" or "not taken", respectively). These processes are particularly useful in a superscalar microprocessor due to the concurrent execution of instructions. For example, consider the instance where a branch instruction arranged first in the sequence is followed at some point thereafter by some later-occurring instruction which, if executed, would cause some result. If a prediction technique accurately states that the branch will be satisfied (i.e., branch taken), then it may well be worthwhile not to concurrently execute the later-occurring instruction. On the other hand, if the prediction technique accurately states that the branch condition will not be satisfied (i.e., branch not taken), then it may well be appropriate and advantageous to concurrently execute the later-occurring instruction.

While branch prediction techniques may be beneficial in certain instances, mispredictions of branch execution can be very costly in terms of microprocessor efficiency. For example, as modern superscalar pipelined machines get deeper (i.e., hold more instructions at varying stages at once), and as such machines also become superpipelined (i.e., capable of more concurrent executions), a mispredicted branch may heavily penalize performance by requiring a pipeline or pipelines to be emptied and subsequently re-filled with instructions from the correct target instruction. In this instance, numerous cycles are required to reset the pipeline(s) to an operational state and, thus, valuable processor cycle time is lost. This problem is particularly prevalent in the case of short forward branches because the probabilities of these branches being taken or not taken are roughly equal. As a result, even sophisticated prediction techniques often mispredict the correct processor flow.

In view of the above, there arises a need to address the drawbacks of the effects of superscalar operations combined with the inherent difficulty in predicting the operation of a short forward branch instruction.

SUMMARY OF THE INVENTION

One inventive embodiment set forth includes a method of operating a processor to process a plurality of sequentially arranged instructions. One method step receives into a processor pipeline an instruction from the plurality of sequentially arranged instructions. Another step determines whether the received instruction comprises a short forward branch instruction, the short forward branch instruction directing processor control to a target instruction in response to satisfying a condition. In response to determining that the received instruction comprises a short forward branch instruction, the method issues a detection signal representing detection of the short forward branch instruction and issues a condition signal representing whether the condition of the short forward branch instruction is satisfied or is not satisfied. Continuing, the method receives into the processor pipeline a first group of instructions of the plurality of sequentially arranged instructions, where each first group instruction is sequentially arranged after the short forward branch instruction and before the target instruction. Further, each such instruction is operable for causing a result, and passes fully through the processor pipeline. Lastly, the method suppresses the result of each first group instruction in response to the detection signal if the condition signal represents that the condition of the short forward branch is satisfied.

Other circuits, systems, and methods are also disclosed and claimed.

BRIEF DESCRIPTION OF THE DRAWINGS

FIG. 2 illustrates a flowchart of additional embodiment steps which respond to a set detection signal by evaluating whether or not the short forward branch instruction is taken;

FIG. 2a modifies FIG. 2 to demonstrate additional embodiment steps which respond to a set predicate tag;

FIG. 3 illustrates an example set of instructions with an arrow indicating a loop between the short forward branch instruction and its corresponding target instruction;

FIGS. 4a, 4b and 4c illustrate the application of the method of FIGS. 1 and 2 to embedded nested instructions;

FIGS. 5a, 5b, and 5c illustrate the application of the method of FIGS. 1 and 2 to overlapping nested instructions;

DETAILED DESCRIPTION OF THE PREFERRED EMBODIMENTS

Figure 1:
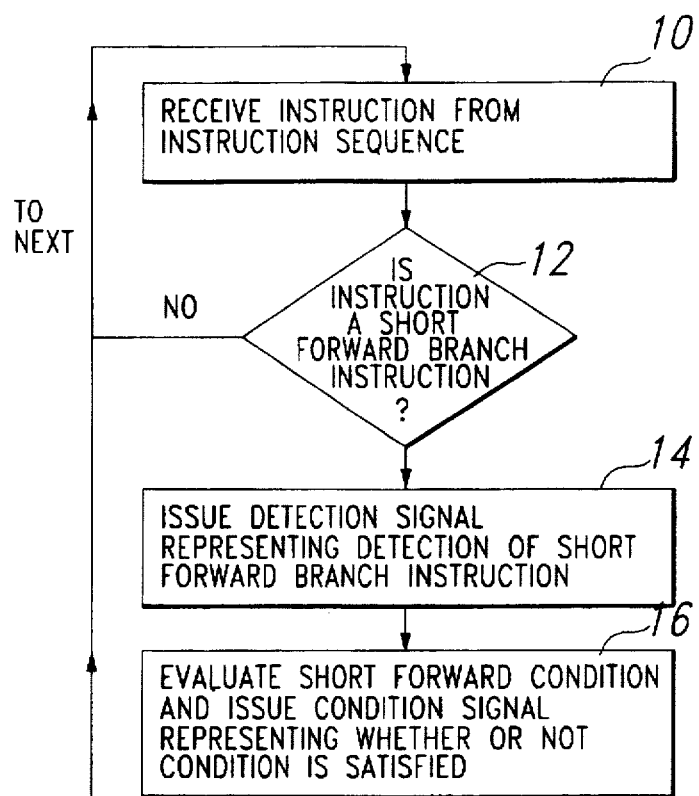
FIG. 1 illustrates a flowchart of a first method embodiment which detects a short forward branch instruction and issues a detection signal for successive instructions.

A first embodiment is initially understood with respect to some simplified examples, and additional method, circuit, and system descriptions are then set forth in connection with FIGS. 1 through 10, below. Table 1, therefore, depicts a series of instructions which serve as a first example of the present embodiment. For example, consider the following pseudo code instructions of Table 1:

TABLE 1

| Instruction Number | Pseudo Code | Action Taken |
|---|---|---|
| (1) | MOVB "a" | load register B with the string character "a" |
| (2) | CMPB "b" | compares the string value in register 8 to the string value "b" |
| (3) | BL (6) | transfers control of the program to instruction number (6) if the preceding compare (i.e., instruction (2)) finds that "a" is less than "b" |
| (4) | INCA | increments the value in register A |
| (5) | MOV A, B | moves the value from register B into register A |
| (6) | INCB | increments the value in register B | where,

"Instruction Number" is the sequence in which the instructions appear in a sequential program;

"Instruction" is the pseudo code applying typical operations to values stored in any one of three registers, denoted A and B; and "Action Taken" is a simplified description of the action taken (if any) on the value(s) shown.

The example of Table 1 is not included to accomplish a particular result, but instead merely demonstrates the operation of a short forward branch instruction, namely, instruction (3). Particularly, one skilled in the art will appreciate from Table 1 that instruction (3) will transfer control of the program sequence directly to instruction (6) only if the value in register B is lower than the string "b". In this example, therefore, this condition is satisfied (because "a" is less than "b") and, therefore, the branch is satisfied (or "taken" as often described in the art). If, on the other hand, the branch condition of instruction (3) were not satisfied, then the branch would not be taken and control would continue to instruction (4) and so on.

Table 1, therefore, demonstrates the program flow involved with a short forward branch instruction. Note further that for purposes of this document, such an instruction is defined as one which transfers control ahead in the same program sequence, as opposed to a different sequence such as a branch to an error routine, or an unconditional instruction such as would be the case with a program call, jump, or other similar instruction. Typically, the short forward branch instruction, if satisfied, advances control forward on the order of twelve or less instructions. For example, instruction (3) of Table 1, if satisfied, advances control ahead three instructions. The particular length of a short forward branch instruction will vary however, based in part on the operating mix of the instructions, such as the operating system(s) and applications used. These factors are usually embodied by a processor designer in benchmarks and traces and can be used to determine the point at which branch predictability becomes unsatisfactory. Branch instructions below this acceptable threshold of predictability will constitute short forward branch instructions. Recognizing the flexibility of the definition of short forward branch instructions, one skilled in the art will appreciate the application of the embodiments herein as applied to the detection and response in connection with those instructions.

As described above, the predictability of short jump branch instructions is extremely low. Thus, in the example of Table 1, if a misprediction occurs, instructions (4) and (5) may be fetched into a pipeline and thereafter require removal and refilling of the pipeline once it is determined that program flow was intended to branch directly to instruction (6). The embodiments described below, however, substantially reduce or eliminate the possibility of having to "flush" and re-fill the pipeline in this manner.

In order to further simplify the present discussion, the specific instructions of Table 1 need not be carried forward. Instead, Table 2 below sets forth a comparable instruction sequence, but particular instructions are made generic solely to illustrate the action of the short forward branch and the present embodiments. Thus, consider the following Table 2:

TABLE 2

| Instruction Number | Pseudo Code |
|---|---|
| (1) | instr |
| (2) | instr |
| (3) | srbi (6) |
| (4) | instr |
| (5) | instr |
| (6) | instr |

The abbreviations in Table 2 simply denote that instructions (1), (2), and (4) through (6) are any non-branching type of instruction, while instruction (3) is a short forward branch instruction (abbreviated "sfbi") which, if its condition is satisfied, transfers program control to the destination instruction (6). For purposes of reference, the destination instruction from a branch instruction will be referred to in this document as the target instruction.

The present embodiments avoid the possibility of having to flush instructions (4) and (5) by allowing those instructions to pass through the pipeline even if the branch is to occur, without therefore having to flush and re-fill the pipeline. In general, once a short forward branch instruction is incurred, detection information is supplied for each subsequent instruction between the short forward branch instruction and the target instruction (referred to hereafter as "intermediary instructions"). As detailed below, this detection information guides the processor to suppress the result of each intermediary instruction if the preceding conditional instruction is satisfied. In other words, if it is detected that the short forward branch will be taken, then the results of the intermediary instructions are suppressed and, therefore, effectively act as no operations (so-called no-ops) as they pass through the pipeline. Such suppression may take place, for example, by not executing the instruction, by not writing its result, by not graduating it, or by taking any other action so that the instruction may pass through the pipeline but have no other affect on program flow or on the architected state of the processor.

The above actions are understood by continuing with the example of Table 2, first by addressing the instance where the condition of instruction (3) is satisfied such that the branch is to be taken, and then by addressing the instance where the condition of instruction (3) is not satisfied such that the branch is not to be taken. For these examples, FIGS. 1 and 2 illustrate flowcharts of various method steps of the present embodiment, and are discussed in connection with Table 2, above. Before proceeding, note that FIG. 1 involves the detection, and response upon detection, of the short forward branch instruction, while FIG. 2 involves the effects of the FIG. 1 actions on instructions following the detection of a short forward branch instruction.

Turning now to FIG. 1, step 10 receives into the processor pipeline an instruction from an instruction sequence arranged in a typical sequential fashion. Thus, from the example of Table 1, step 10 first evaluates instruction (1). Note that the sequence arrangement is dictated by the order of the program code, but as known in the art, instruction fetching, decoding, execution, and other steps may be concurrent or even out of order. For example, several instructions (e.g., numbers (1) through (4) in Table 2) actually may be fetched at once. As another example, in superscalar operation, certain instructions may be executed concurrently or even out of their sequence order. Step 10, therefore, merely intends to depict that instructions are somehow retrieved and then each is analyzed according to the following steps.

Step 12 determines whether the instruction at issue is a short forward branch instruction. For example, step 12 would determine that instruction (1) of Table 2 is not a short forward branch instruction. On the other hand, if instruction (3) from Table 2 were the instruction currently being analyzed, step 12 would determine that the instruction indeed is a short forward branch instruction. Either determination may be performed using known decoding techniques or BTB flags, etc. and, of course, will depend in part on the instruction set at issue. If the instruction at issue is not a short forward branch instruction, the method of FIG. 1 returns to step 10 to analyze the next instruction. On the other hand, if the instruction at issue is a short forward branch instruction, the method of FIG. 1 continues to step 14.

Steps 14 and 16 create indications for successive instructions to respond to the detection of the short forward branch instruction. Particularly, step 14 sets an indicator that a short forward branch instruction has been detected. For purposes of this document, this information is referred to generally as a detection signal. As demonstrated below, this signal may take different forms in different embodiments, but in each instance, the signal represents to subsequent steps that a short forward branch instruction has been detected and, thus, those steps should respond in the fashion set forth below.

Step 16 evaluates whether or not the condition of the short forward branch instruction is satisfied, and issues and/or stores a signal, referred to here as a condition signal, representing the result of that determination. For example, step 16 would determine that the condition of instruction (3) in Table 1 is satisfied and, therefore, the resulting condition signal would indicate that the branch is to be taken. Once step 16 completes, the procedure of FIG. 1, for purposes of detecting short forward branch instructions, returns to step 10. Therefore, the circular nature of FIG. 1 might actually detect successive short forward branch instructions. For purposes of simplifying the current explanation, a discussion of this possibility is deferred and discussed later in connection with FIG. 4a through FIG. 6, below.

FIG. 2 illustrates the effects of the FIG. 1 actions on instructions following the detection of a short forward branch instruction. Step 18 receives an additional instruction in the group of sequentially arranged instructions. Thus, since FIG. 2 takes effect after the detection of a short forward branch instruction, the first instance of step 18 would consider instruction (4) because it is the next sequentially arranged instruction with respect to short forward branch instruction (3). Step 20 evaluates whether the detection signal was earlier set due to the detection of a short forward branch instruction. If the detection signal is set, the method continues to step 22, whereas if the detection signal is not set, the method continues to step 24 to permit the result of the current instruction and, thereafter, the method returns to step 18 to analyze the next instruction in the sequence. In the current example, the detection signal is set when instruction (4) is analyzed because 14 step of FIG. 1 detected short forward branch instruction (3). Consequently, the method continues to step 22.

Step 22, having been reached due to a set detection signal, evaluates whether or not the condition of the short forward branch instruction is satisfied (i.e., whether or not the branch is to be taken). If the condition is not satisfied, the method continues to step 24 whereas if the condition is satisfied, the method continues to step 26. Because the example of instruction (3) is satisfied, let us first evaluate step 26 and then follow with step 24.

In step 26, because the preceding short forward branch instruction is satisfied, the result of the instruction at issue is suppressed. Thus, although the instruction at issue passes fully through the pipeline, the architected portion of the processor does not see its result. Again, result suppression may be accomplished in various ways; such as preventing instruction execution, writing, or writeback. In another example, all steps other than graduation of an instruction may occur. Again, therefore, result suppression in this document indicates that for result purposes the instruction at issue has no effect on the architected state of the processor. Thus, even in the instance of a no-op instruction, the architected program counter would not increment if the result of this no-op instruction were suppressed. Returning then to the current example, step 26 suppresses the result of instruction (4) because the condition of instruction (3) is satisfied. Consequently, instruction (4) will have no effect on the overall results of the instruction stream and, instead, will merely pass through the processor pipeline in the same manner as a so-called no-op instruction (but without incrementing the architected program counter). Moreover, after step 26 completes, the process returns to step 18 and, therefore, evaluates the next sequentially arranged instruction in the same manner. Continuing with the current example, one skilled in the art will appreciate that when instruction (5) is analyzed, the detection signal is still set and, therefore, the result of instruction (5) also is suppressed because the condition of instruction (3) is satisfied. The flow then repeats a third time to analyze instruction (6). In this instance, however, step 20 determines that instruction (6) is the target instruction for instruction (3). Consequently, it is determined that all instructions between the short forward branch and its target (i.e., all intermediary instructions) have been analyzed. As a result, the detection signal is either cleared or disregarded with the understanding that the target instruction has been reached. In the case of the latter, the detection signal is subsequently cleared before analyzing further instructions to detect the next short forward branch instruction. In all events, therefore, with the cleared or disregarded detection signal, the flow will return to step 18.

Step 24 is reached from a negative finding of either step 20 or step 22 In either instance, step 24 causes the result of the instruction at issue. This step, therefore, merely causes the opposite effect of that created by step 26. Thus, as opposed to suppressing the result (e.g., suppressing execution, writeback, or graduation), step 24 allows the instruction to execute and write its result or take its intended action as in any normal execution of an instruction. Once step 24 is complete, the method returns to step 18 to analyze the next instruction in the sequence.

Having explained the above example step-by-step, note now the overall effect with respect to the instructions of Table 2. Particularly, after detecting a short branch instruction which has a condition to be taken (i.e., instruction (3)), all intermediary instructions following the branch instruction (i.e., instructions (4) and (5)) are effectively treated as no-op instructions (although the architected program counter does not increment). Due to this treatment, and in stark contrast to the prior art, there is the advantage that these additional instructions do not cause execution problems and do not cause the instruction pipeline to be flushed and subsequently re-filled. Therefore, the prior art performance penalty discussed above is removed and processor efficiency in the context of short forward branch instructions is vastly improved under the present embodiment. Note also that the embodiment of FIG. 2 illustrates an analysis which ultimately affects the completion of results for each intermediary instruction. This analysis may take place in different embodiments, and exemplary ones of such embodiments are detailed in the many Figures below.

In addition to the above, note also the overall effect of FIGS. 1 and 2 if the short forward branch instruction (e.g., instruction (3)) were one which was not satisfied (i.e., not taken). In this instance, having determined that a branch is not to occur, the combination of steps 20 and 24 simply cause the result of each intermediary instruction to occur. Thus, in this alternative case the above embodiment maintains proper program flow through the processor pipeline.

Figure 1A:
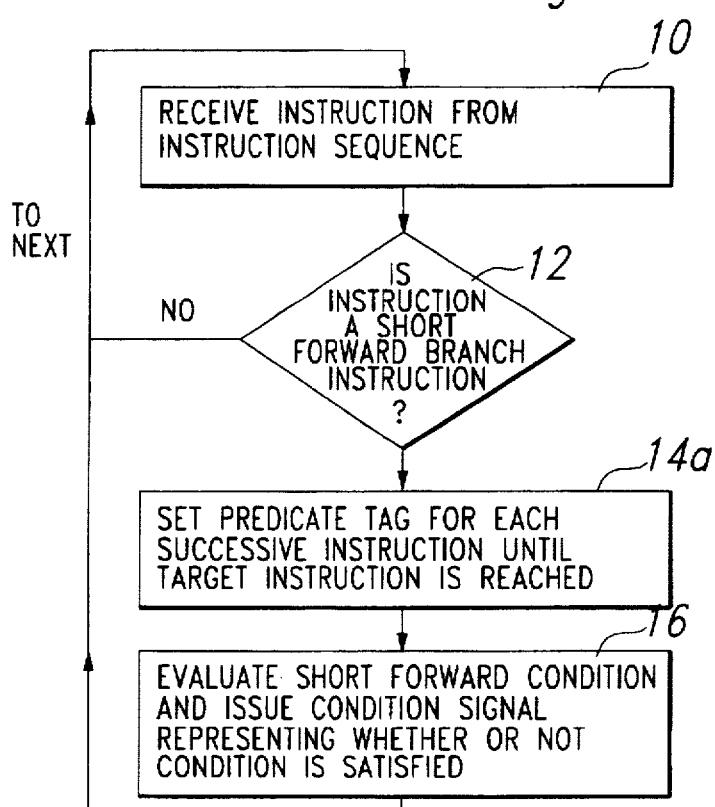
FIG. 1a modifies FIG. 1 to demonstrate a predicate tag as the detection signal for successive instructions.

A first embodiment for indicating detection of a short forward branch instruction, and subsequent response to that detection, is shown in FIGS. 1a and 2a, respectively. Note that FIGS. 1a and 2a are identical in most respects to FIGS. 1 and 2, respectively, and common reference numbers are used in those areas. However, FIG. 1a substitutes a block 14a for block 14 of FIG. 1, and FIG. 2a substitutes a block 20a for block 20 of FIG. 2. The affect of these changes is to illustrate the present embodiment, and is discussed in detail below.

Turning then to FIG. 1a, again blocks 10 and 12 operate as above to receive an instruction into the processor pipeline and determine whether or not it is a short forward branch instruction. Block 14a, upon detecting a short forward branch instruction, sets a particular detection signal referred to herein as a predicate tag. In the preferred embodiment, this predicate tag is an additional bit (or bits as discussed below) which is appended to all instructions, but which is set to a particular state for intermediary instructions. Thus, this additional bit is simply set or left cleared based on the determination of step 14. The bit is referred to as a "predicate" because, as demonstrated below, its state predicates whether the result of the instruction to which the bit is appended is suppressed or not. Lastly, block 16 operates as in the manner described above and, therefore, creates the appropriate condition signal.

Turning now to FIG. 2a, it may be appreciated how the present embodiment responds to the predicate tag described above. After receiving the next instruction following the detected short forward branch instruction, the received instruction has a set predicate tag from step 14a, above. Thus, in step 20a, this predicate tag is detected and the flow therefore continues to step 22. Step 22 operates as above and, consequently, the method continues to either step 26 or step 24 based on whether or not, respectively, the condition of the short forward branch instruction is taken. Further, the method then returns to step 18, and flows onward to step 20a. Thus, one skilled in the art will appreciate that each intermediary instruction following a detected short forward branch instruction has a set predicate tag, and this tag may be detected to take the appropriate actions set forth in FIG. 2a.

As mentioned above, the use of predicate tags is but one of alternative mechanisms for accomplishing the embodiment or FIGS. 1 and 2. While an alternative embodiment to FIGS. 1a and 2a also will be described, it is first instructive to evaluate more complicated instruction sequences, namely, those of nested short forward branch instructions. In this regard, the above embodiment and examples address an instance of a single instance of a short forward branch instruction followed by a few intermediary instructions and ultimately by a target instruction. This flow, shown by example in Table 2, is also illustrated diagrammatically in FIG. 3 with an arrow indicating a loop 28 between the short forward branch instruction (3) and the corresponding target instruction (6). FIGS. 4a and 5a, however, depict diagrammatically more complicated scenarios where, following the first short forward branch instruction, a second short forward branch instruction is incurred by the method before the target instruction corresponding to the first short forward branch is reached. As demonstrated below, the embodiments set forth herein also accommodate these more complicated variations, each of which is described below.

FIG. 4a illustrates an example of short forward branching involving two embedded nested branches. Particularly, in FIG. 4a, a first loop 30 is shown encircling the instructions from short forward branch instruction (1) to its corresponding target instruction (6). However, FIG. 4a further illustrates a second loop 32, which is shown encircling the instructions from short forward branch instruction (3) to its corresponding target instruction (5). Note that loop 32 is within, and does not overlap, loop 30, and thus these loops are referred to as embedded. This ordering is in contrast to that shown in FIG. 5a, discussed immediately below.

FIG. 5a illustrates an example of short forward branching involving two overlapping nested branches. Particularly, in FIG. 5a, a first loop 34 is shown encircling the instructions from short forward branch instruction (1) to its corresponding target instruction (5). However, FIG. 5a further illustrates a second loop 36, which is shown encircling the instructions from short forward branch instruction (3) to its corresponding target instruction (7). Note that loop 34 overlaps, loop 36, and thus these loops are referred to as overlapping.

As mentioned above, the embodiments herein address the more complicated scenarios presented by FIGS. 4a and 5a. To simplify the discussion, the case of FIG. 4a is explained first and in connection with the embodiment of FIGS. 1a and 2a; thereafter, there is included a comparable discussion of the case of FIG. 5a. Additionally, step 22 is initially not discussed so the effect of whether or not the condition is satisfied does not confuse the progression through the nested loops. Instead, the effect of step 22 is further addressed with respect to FIG. 6, below.

Applying the method of FIGS. 1a and 2a to FIG. 4a, steps 10 through 14a identify instruction (1) as a first short forward branch instruction and, therefore, set a predicate tag for each of intermediary instructions (2) through (4). This action is depicted in FIG. 4b by the label PT1, the "PT" indicating a predicate tag, and the number "1" indicating that the short forward branch is the first one in the nested branches. Step 16 also evaluates whether or not the condition of instruction (1) is satisfied. Next, the process of FIG. 1 repeats for the next instruction, that is, instruction (2). Since instruction (2) is not a short forward branch instruction, step 12 returns the flow to step 10 to analyze instruction (3). Here, however, instruction (3) is an additional short forward branch instruction. As a result, the next occurrence of step 14 sets an additional predicate tag for each intermediary instruction corresponding to instruction (3). This action is shown in FIG. 4c by adding the label PT2 to instruction (4), thereby indicating that this instruction is an intermediary instruction for a second short forward branch instruction, and the PT1 further indicates that the same instruction is also as an intermediary instruction for the first short forward branch instruction. From the above, therefore, one skilled in the art will appreciate that the method of FIG. 1 addresses the case of embedded nested short forward branch instructions to designate predicate tags for intermediary instructions.

Figure 6:
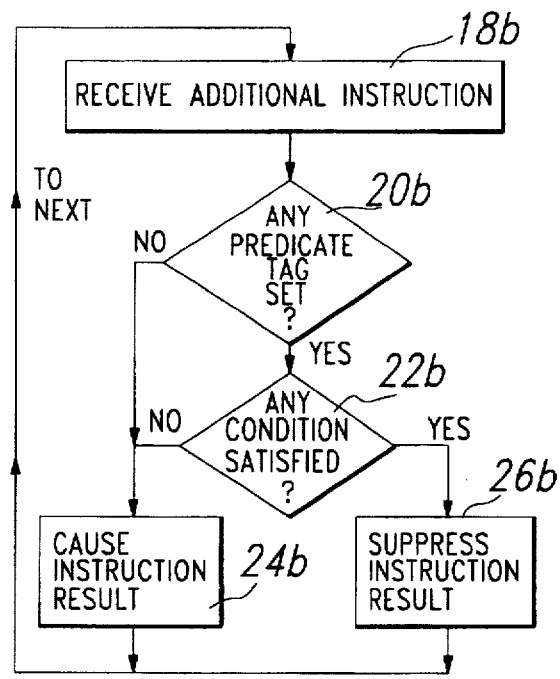
FIG. 6 illustrates a flowchart of an additional embodiment which responds to multiple predicate tags arising from nested short forward branch instructions.

Having shown the designation of multiple predicate tags for nested short forward branch instructions, FIG. 6 is a flowchart depicting the action taken on those multiple predicate tags. Before proceeding, note that FIG. 6 is similar in flow to FIG. 2a, but FIG. 6 is further modified to handle the multiple predicate tags. To demonstrate the relatedness of steps between FIGS. 2 and 6, the reference numbers of FIG. 2a are modified by substituting the letter "b" to each such number.

Turning now to FIG. 6, step 18b receives an additional instruction in the same manner as step 18a. Step 20b determines whether any (i.e., one or more) predicate tag is set. If not, the flow continues to step 24b to cause the result of the instruction at issue. If any predicate tag is set, the method continues to step 22b.

Step 22b evaluates whether on not the condition is satisfied for each branch instruction corresponding to each set predicate tag. For example, in FIG. 4c and for instruction (4), step 20b would note both set predicate tags PT1 and PT2. Consequently, step 22b evaluates the satisfaction, or lack thereof, of the conditions for both branch instructions (1) and (3). Next, the flow continues to step 26b if any of the multiple conditions are satisfied and, thus, the flow alternatively continues to step 24b only if none of the multiple conditions are satisfied. Thus, with reference to FIG. 4c, if either the first or third branch were to be taken, then step 22b would cause flow to step 26b such that the result of instruction (4) were suppressed. On the other hand, only if neither the first nor the third branch were taken would step 24b be reached so that the result of instruction (4) would be permitted to occur.

From the above, it is readily appreciated that the embodiment described also improves processor performance even in the instance of embedded nested branch instructions. Moreover, while the example of FIGS. 4a–c depict only two such nested branch instructions, one skilled in the art will appreciate that the same embodiment would perform equally for any number of additional short forward branches arranged in an embedded nested manner.

Having discussed the method as applied to the nested branches of FIG. 4a, the following discusses the alternative nesting shown in FIG. 5a. Applying the method of FIGS. 1a and 2a to FIG. 5a, steps 10 through 14a identify instruction (1) as a first short forward branch instruction and, therefore, set a predicate tag for each of intermediary instructions (2) through (4). This action is depicted in FIG. 5b by the label PT1. Step 16 also evaluates whether or not the condition of instruction (1) is satisfied and issues a condition signal to this effect. Next, the process of FIG. 1 repeats for the next instruction, that is, instruction (2). Since instruction (2) is not a short forward branch instruction, step 12 returns the flow to step 10 to analyze instruction (3). Here, however, instruction (3) is an additional short forward branch instruction. As a result, the next occurrence of step 14 sets an additional predicate tag for each intermediary instruction corresponding to instruction (3). This action is shown in FIG. 5c by adding the label PT2 to instructions (4) through (6). From the above, therefore, one skilled in the art will appreciate that the method of FIG. 1a also addresses the case of overlapping nested short forward branch instructions to designate predicate tags for intermediary instructions.

Having shown the designation of multiple predicate tags for overlapping nested short forward branch instructions, note that the flow chart of FIG. 6, discussed above with respect to embedded nesting, also operates to accommodate overlapping nesting as well. Thus, applying the steps of FIG. 6 to the depiction in FIG. 5c, and starting from instruction (2), step 20b notes that PT1 is set and, thus, continue to step 22b. Because only one predicate tag is set at this point, step 22b evaluates only the condition of branch instruction (1) and continues the flow to either step 26b or step 24b depending on whether or not that condition is satisfied. The process then continues to step 18b for both instructions (2) and (3), and for both of those instructions the flow will again reach step 22b due to the presence of PT1. Once instruction (4) is reached, the flow of FIG. 6 operates in the same manner as it did with respect to instruction (4) in FIG. 4c, that is, at step 22b the conditions of both preceding short forward branch instructions are analyzed, and the flow continues to either step 24b or 26b in the same manner as described above.

From the above, it is further appreciated that the embodiment described also improves processor performance even in the instance of overlapping nested branch instructions. Still further, while the example of FIGS. 5a–c depict only two such nested branch instructions, one skilled in the art will appreciate that the same embodiment would perform equally for any number of additional short forward branches arranged in an overlapping nested manner.

Figure 7:
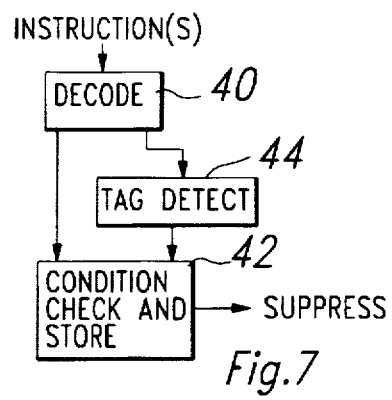
FIG. 7 illustrates a block diagram of a circuit embodiment using predicate tags for accomplishing the methods of the above figures.

Given the methodologies above, FIG. 7 illustrates a block diagram demonstrating circuit blocks to accomplish the methods described above. A decode block 40 receives at its input one or more instructions. Decode block 40 outputs condition information to a condition check and store block 42, and predicate tag information to a tag detect block 42. Reviewing FIG. 7 in conjunction with earlier figures, decode block 40 receives one or more instructions and for each determines whether it is a short forward branch instruction. If so, the predicate tag may be set while the instruction is still in the decode stage, again by adding a bit to the instruction which will correspond to the tag, or setting a bit which is earlier added and by being set which indicates the detection of the short forward branch instruction. Decode block 40 also communicates sufficient condition information to block 42 so that the latter can evaluate whether or not the condition is satisfied. Block 42, therefore, necessarily includes access to information such as condition registers. Block 42 further includes some type of storage, such as a register file, to store a condition signal for each short forward branch instruction (i.e., single such instruction for FIG. 2a, multiple such instructions for FIG. 6), where that condition signal indicates whether or not the condition is satisfied. To assist with the steps of FIG. 2a (or FIG. 6), block 44 detects a set predicate tag and communicates this detection to block 42. Block 42 further includes logic so that, upon receiving the predicate tag detection, it can make the determination of FIG. 2a step 2—2 or FIG. 6 step 22b. Lastly, block 42 is operable to output a suppress signal which can cause the effect of FIG. 2 step 26 or FIG. 2a step 26a.

Figure 8:
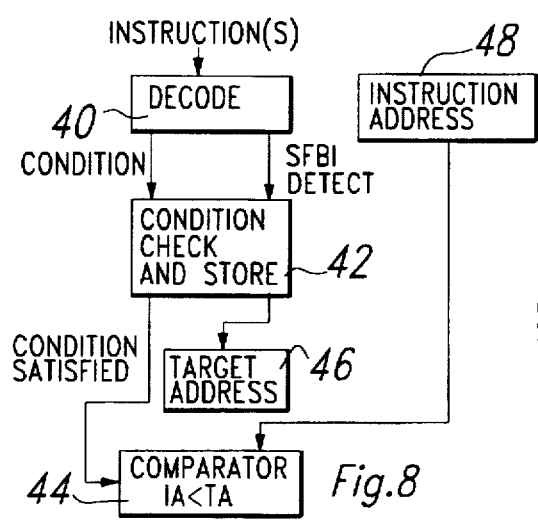
FIG. 8 illustrates a block diagram of a circuit embodiment using address comparison for accomplishing the methods of the above figures.

Having described the use of predicate tags to effect the methodology of FIGS. 1a and 2a, FIG. 8 illustrates a block diagram of an alternative embodiment which performs the methods of FIGS. 1 and 2 without the use of predicate tags.

FIG. 8 includes blocks 40 and 42 in a manner similar to FIG. 7. Thus, block 40 receives one or more instructions for decoding, and communicates conditional information as well as a short forward branch instruction detect signal to block 42. Block 42 determines whether or not the condition of the short forward branch instruction is satisfied and stores the result of this determination as a condition signal. If a positive determination is made, block 42 further communicates this condition satisfied signal to control a comparator 44, and also communicates the target address to a register 46 or equivalent storage device. Comparator 44 compares the branch target address to an instruction address stored in a separate register 48 or equivalent address pointer as described below.

The operation of the FIG. 8 blocks are appreciated by returning to the method set forth in FIGS. 1 and 2. First, decode block 40 receives the instruction as in step 10, and block 42 performs step 12 to determine whether or not the currently analyzed instruction is a short forward branch instruction. If the instruction at issue is not a short forward branch instruction, blocks 44 through 48 need not be implicated. On the other hand, if the instruction at issue is a short forward branch instruction, block 40 performs step 14 to issue a detection signal to block 42 (illustrated as SFBI detect). In response, block 42 performs step 16 to determine if the condition is satisfied, and reports the result by a control signal to comparator 44. The control of comparator 44 is understood with respect to the steps of FIG. 2 as described below.

The remaining blocks of FIG. 8 operate with blocks 40 and 42 to perform the steps of FIG. 2, assuming that a short forward branch has been detected and that the intermediary instructions following it are being analyzed. Thus, decode block 18 receives an additional intermediary instruction following the short forward branch instruction. Block 42 then performs steps 20 and determines that a detection signal is set (given the current example). Thus, block 42 performs step 22 to determine whether or not the condition of the current short forward branch instruction is satisfied. The remaining steps and blocks operate so that if the condition is not satisfied, then the result of the intermediary instruction is caused, whereas if the condition is satisfied, then the result of the intermediary instruction is suppressed.

If the condition of the preceding short forward branch instruction is not satisfied, then comparator 44 is not enabled by block 42. Consequently, the result of the intermediary instruction is not suppressed, and the instruction can complete execution, writeback, and graduation. Thereafter, each subsequent intermediary instruction will likewise be permitted to graduate because the condition of the preceding short forward branch instruction was not satisfied.

If the condition of the preceding short forward branch instruction is satisfied, the embodiment suppresses the result of each intermediary instruction using an address comparison as follows. First, the satisfied condition causes block 42 to enable comparator 44. Comparator 44 then compares the target address with the address of the current instruction. Since the current instruction is an intermediary instruction, its address will be less than the address of the target instruction. As a result, comparator 44 issues a signal representing this relationship, and that signal therefore further indicates that the result of the instruction should be suppressed in any of the manners set forth above. Note further that as each subsequent intermediary instruction is analyzed, its corresponding address will still be less than the target address; consequently, the result of each such intermediary instruction also will be suppressed. Alternatively, however, once the address from register 48 matches that of register 46, it is known that the corresponding instruction at that point is the target instruction, and suppression no longer takes place.

From the above, therefore, one skilled in the art will appreciate that the embodiment of FIG. 8 provides an alternative mechanism for accomplishing the methodologies of FIGS. 1 and 2. In addition, note also that the FIG. 8 embodiment may be further modified to accommodate nested branches, as shown and discussed in connection with FIGS. 4a and 5a. Particularly, for each nested short forward branch instruction, a separate copy would be kept of its corresponding target address. Thus, when result suppression is to take place (i.e., a satisfied short forward branch is detected), each tine an instruction is incurred its address is compared to the target address for the corresponding short forward branch, and the instruction result is suppressed until the target instruction is reached.

To appreciate the effect of embedded nesting, consider two examples in the case of FIG. 4a. As a first example, assume that the conditions of both instruction (1) and instruction (3) are satisfied. As a result, a copy of each target address corresponding to instructions (1) and (3) would be separately saved in a register such as register 46. Next, when instruction (4) is analyzed by FIG. 8, its address is compared to the stored target addresses and, indeed, is less than the target address for either instruction (5) or instruction (6). Thus, in either instance, the result of instruction (4) is suppressed. As a second example, assume that the condition of instruction (1) is not satisfied and instruction (3) is satisfied. Thus, only the target address for instruction (3) is stored in register 46. Thus, when instructions (2) and (3) are analyzed for purposes of potential suppression, no address comparison is made because instruction (1) is not satisfied. When instruction (4) is analyzed for purposes of potential suppression, its result is suppressed because its address is less than the target address of instruction (5). When instruction (5) is analyzed, its address is equal to the stored target address and, therefore, the instruction result is not suppressed.

To appreciate the effect of overlapping nesting, consider an example in the case of FIG. 5a. As a first example, assume that the conditions of both instruction (1) and instruction (3) are satisfied. Again, therefore, a copy of each target address corresponding to instructions (1) and (3) is separately saved in a register such as register 46. When instructions (2) through (4) are analyzed, each address is less than the address of target instruction (5) and, therefore the corresponding result is suppressed. When instruction (5) is analyzed, its address matches that of the first target address (5) so for that comparison there is no suppression. However, its address is also compared to the secondly stored address of target instruction (7). In this case, its address is less that the secondly stored address of target instruction (7) and, therefore, its result is suppressed.

Additional examples for the operation of the FIG. 8 circuits are not included so as not to unduly lengthen the current explanation. A person skilled in the art should easily appreciate from the above descriptions and examples that the FIG. 8 embodiment accurately applies the methods described above to both embedded and overlapping nested short forward branch instructions.

Figure 9:
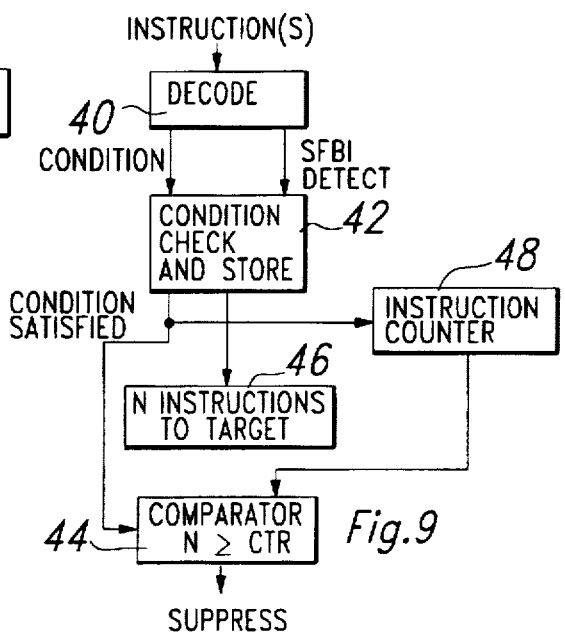
FIG. 9 illustrates a block diagram of a circuit embodiment using intermediary instruction counting for accomplishing the methods of the above figures.

Having described the use of predicate tags or address comparison to effect the methodology of FIGS. 1 through 2a, FIG. 9 illustrates a block diagram of yet another alternative embodiment to perform related methods. FIG. 9 includes blocks 40 and 42 in a manner similar to FIG. 8 which, again, decode and evaluate instructions to detect the satisfaction of a short forward branch instruction. Also like FIG. 8, in FIG. 9 block 42 further communicates this condition satisfied signal to control a comparator 44. In FIG. 9, upon detecting a satisfied short forward branch instruction, block 42 communicates the number of intermediary instructions, denoted N, to a register 46 or equivalent storage device. As demonstrated below, comparator 44 compares the number N to a count from a counter 48 to determine whether result suppression is appropriate.

The operation of the FIG. 9 blocks are appreciated by returning to the method set forth in FIGS. 1 and 2, but a detailed discussion is unnecessary for certain features which are similar or the same as in FIG. 8. Briefly, therefore, decode block 40 and block 42 perform steps 10 and 12 until the instruction at issue is a short forward branch instruction, and again a detection signal is issued in response to the detection. In response, block 42 once again performs step 16 to determine if the condition is satisfied, and reports the result by a control signal to comparator 44. The control of comparator 44 is understood with respect to the steps of FIG. 2 as described below.

The remaining blocks of FIG. 9 operate with blocks 40 and 42 to perform the steps of FIG. 2, assuming that a short forward branch has been detected and that the intermediary instructions following it are being analyzed. Thus, decode block 18 receives an additional intermediary instruction following the short forward branch instruction. Block 42 then performs step 20 and determines that a detection signal is set (given the current example). Thus, block 42 then performs step 22 to determine whether or not the condition of the current short forward branch instruction is satisfied. The remaining steps and blocks operate so that if the condition is not satisfied, then the result of the intermediary instruction is caused, whereas if the condition is satisfied, then the result of the intermediary instruction is suppressed.

If the condition of the preceding short forward branch instruction is not satisfied, then comparator 44 is not enabled by block 42. Consequently, the result of the intermediary instruction is not suppressed, and the instruction can complete execution, writeback, and graduation. Thereafter, each subsequent intermediary instruction is likewise permitted to graduate because the condition of the preceding short forward branch instruction was not satisfied.

If the condition of the preceding short forward branch instruction is satisfied, the embodiment suppresses the result of each intermediary instruction using an instruction count technique as follows. First, the satisfied condition causes block 42 to enable comparator 44, and also causes instruction counter 48 to begin counting each intermediary instruction as it passes through the pipeline. Comparator 44 then compares the total number of intermediary instructions with the number of intermediary instructions which have been counted. Assume for example that three intermediary instructions follow the satisfied short forward branch instruction. Thus, when the first intermediary instruction is analyzed, counter 48 will total one while register 46 will total three. Thus, comparator 44 determines that N is greater than the counter value and will issue a suppression signal, thereby suppressing the result of the intermediary instruction. Similarly, as the second and third intermediary instructions are analyzed, N continues to be greater than (or in the case of the third intermediary instruction, equal to) the counter value and result suppression continues. On the other hand, when the fourth instruction, which is also the target instruction, is analyzed, the comparison of comparator 44 is not satisfied and no suppression signal is issued. Consequently, the result of the target instruction is permitted to occur.

From the above, therefore, one skied in the art will appreciate that the embodiment of FIG. 9 provides an alternative mechanism for accomplishing the methodologies of FIGS. 1 and 2. In addition, note also that the FIG. 9 embodiment may be further modified to accommodate nested branches, as shown and discussed in connection with FIGS. 4a and 3a. Particularly, for each nested short forward branch instruction, a separate copy is stored of its number of intermediary instructions, and a separate count is maintained as each of its corresponding intermediary instructions are analyzed. Thus, when result suppression is to take place (i.e., a satisfied short forward branch is detected), each time an instruction is incurred its number of intermediary instructions is compared to the incrementing count for the corresponding short forward branch, and the instruction result is suppressed until the target instruction is reached. Further, given the many examples set forth above, additional examples are not presented herein to further demonstrate the operation of FIG. 9. However, it should be abundantly clear to a person skilled in the art that the FIG. 9 embodiment accurately applies the methods described above to both embedded and overlapping nested short forward branch instructions.

Figure 10:
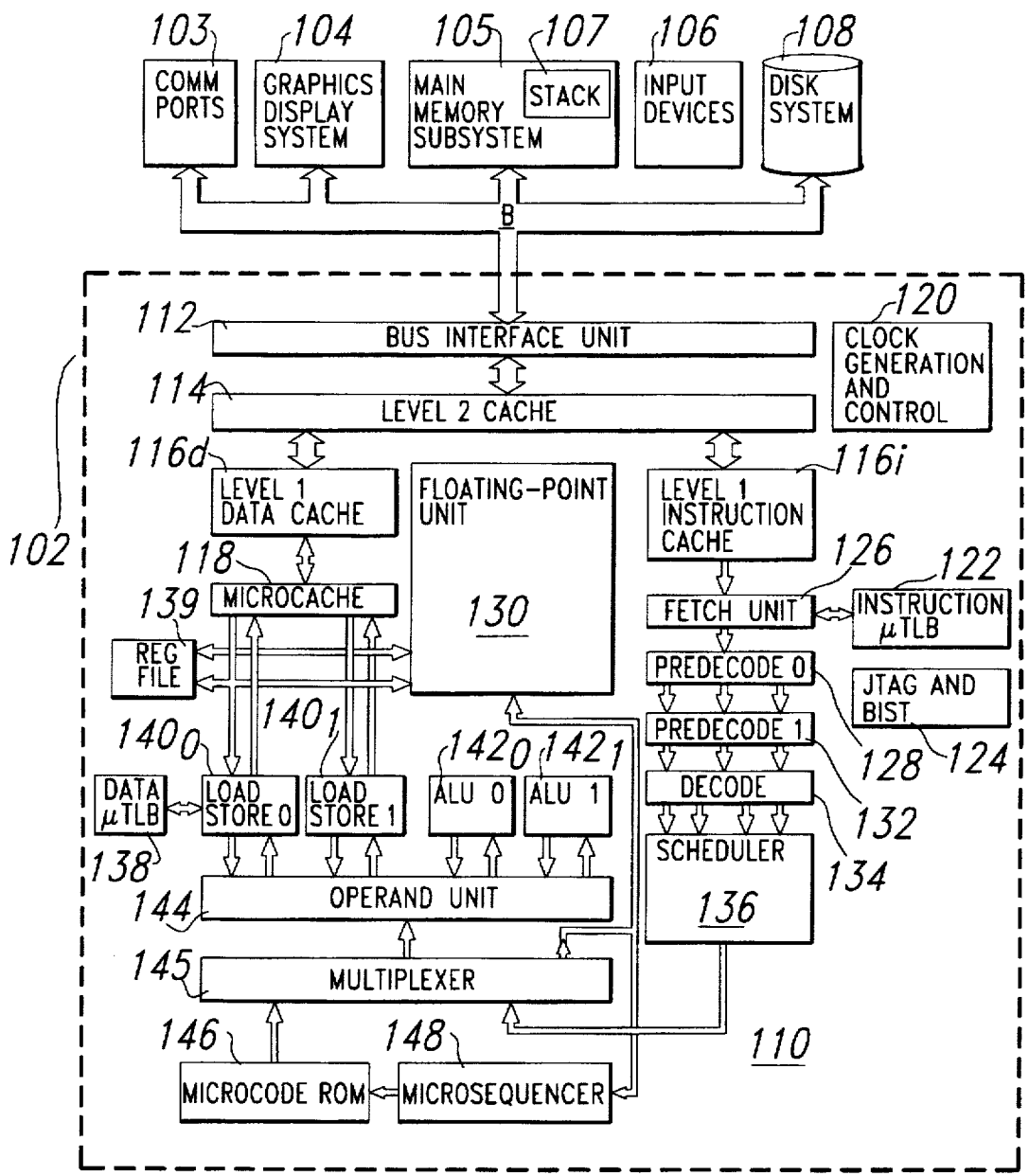
FIG. 10 illustrates a block diagram of a computer system and microprocessor embodiment into which the above embodiments may be incorporated.

Having described the above embodiments, FIG. 10 illustrates a block diagram of a microprocessor embodiment into which the above embodiments may be incorporated. Referring now to FIG. 10, an exemplary data processing system 102, including an exemplary superscalar pipelined microprocessor 110 within which the preferred embodiment of the invention is implemented, will be described. It is to be understood that the architecture of system 102 and of microprocessor 110 is described herein by way of example only, as it is contemplated that the present invention may be utilized in microprocessors of various architectures, with particular benefit to those of the superscalar type. It is therefore contemplated that one of ordinary skill in the art, having reference to this specification, will be readily able to implement the present invention in such other microprocessor architectures.

Microprocessor 110, as shown in FIG. 10, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM), input devices 106 (including keyboard, a pointing device, and the interface circuitry therefor), and disk system 108 (which may include hard disk drives, floppy disk drives, and CD-ROM drives). It is therefore contemplated that system 102 of FIG. 10 corresponds to a conventional desktop computer or workstation, as are now common in the art. Of course, other system implementations of microprocessor 110 can also benefit from the present invention, as will be recognized by those of ordinary skill in the art.

Microprocessor 110 includes bus interface unit 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 10, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114. Of course, microprocessor 110 may also effect bus traffic around cache 114, by treating certain bus reads and writes as "not cacheable". Level 2 cache 114, as shown in FIG. 10, is connected to two level 1 caches 116; level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, and in this example is a fully dual-ported cache.

As shown in FIG. 10 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_1$ for processing conditional branch, integer, and logical operations, floating-point unit (FPU) 130, two load-store units $140_0$, $140_1$, and microsequencer 148. The two load-store units 40 utilize the two ports to microcache 118, for true parallel access thereto, and also perform load and store operations to registers in register file 139. Data microtranslation lookaside buffer (µTLB) 138 is provided to translate logical data addresses into physical addresses, in the conventional manner.

These multiple execution units are controlled by way of multiple seven-stage pipeline These stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back : This stage stores the results of the execution in registers or in memory Referring back to FIG. 10, the pipeline stages noted above are performed by various functional blocks within microprocessor 110. Fetch unit 126 generates instruction addresses from the instruction pointer, by way of instruction microtranslation lookaside buffer (µLTB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution. As indicated in FIG. 10, operand unit 144 receives an input from sequencer 144 and also from microcode ROM 146, via multiplexer 145, and fetches register operands for use in the execution of the instructions. In addition, according to this example, operand unit performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 10, as well as the descriptions above such as those relating to the prior Figures, one skilled in the art may appreciate that the above embodiments may be incorporated into microprocessor 110, such as within fetch unit 126, predecode 0 stage 128, and predecode 1 stage 132. Various related functionality may be further performed by the appropriate circuitry within FIG. 10.

From the above, it may be appreciated that the embodiments of the present invention provide numerous technical advantages over the prior art. For example, there has been shown a method, circuit, and system with improved performance by avoiding potential downfalls arising from mispredicted short forward branch instructions. Particularly, the embodiments shown above vastly reduce the likelihood of a pipeline flush and re-fill due to a mispredicted short forward branch instruction. In addition, suppressing the result of certain instructions also may expedite the availability of other processor resources. For example, if a suppressed intermediary instruction were an entry point into a microROM and were not immediately suppressed, the microROM would be burdened by the instruction (and successive microROM issued instructions) until the misprediction was identified. However, under the embodiments above, the microROM is not wrongfully accessed in such an instance because the entry instruction is suppressed before accessing the microROM. Thus, the microROM is free for other purposes during a time in which it might be burdened in the prior art. Thus, these benefits, as well as various alternatives set forth herein, demonstrate the inventive scope. Still further, while certain mechanisms for establishing detection signals are disclosed, other techniques for providing the necessary information for successive operations should be ascertainable by a person skilled in the art. Consequently, while the embodiments have been described in detail, various substitutions, modifications or alterations could be made to the descriptions set forth above without departing from the invention which is defined by the following claims.

What is claimed is:

1. A method of operating a processor to process a plurality of sequentially arranged instructions, said method comprising the steps of:

receiving into a processor pipeline an instruction from the plurality of sequentially arranged instructions;

determining whether the received instruction comprises a short forward branch instruction, the short forward branch instruction directing processor control to a target instruction in response to satisfying a condition;

in response to determining that the received instruction comprises a short forward branch instruction, the steps of:

issuing a detection signal representing detection of the short forward branch instruction; and issuing a condition signal representing whether the condition of the short forward branch instruction is satisfied or is not satisfied;

receiving into the processor pipeline a first group of instructions of the plurality of sequentially arranged instructions, wherein each first group instruction is sequentially arranged after the short forward branch instruction and before the target instruction, and is operable for causing a result;

passing each first group instruction fully through the processor pipeline; and suppressing the result of each first group instruction in response to the detection signal if the condition signal represents that the condition of the short forward branch is satisfied.

2. The method of claim 1 and further comprising the step of causing the result of the first group instruction in response to the detection signal if the condition signal represents that the condition of the short forward branch is not satisfied.

3. The method of claim 2 wherein said step of issuing a detection signal comprises setting a predicate tag bit appended to each first group instruction.

4. The method of claim 3 wherein, for each first group instruction:

said causing step comprises causing the result of the first group instruction if the predicate tag is set and the condition signal represents that the condition of the short forward branch is not satisfied; and said suppressing step comprises suppressing the result of the first group instruction if the predicate tag is set and the condition signal represents that the condition of the short forward branch is satisfied.

5. The method of claim 1 wherein each first group instruction has a corresponding address, and said suppressing step comprises:

in response to the detection signal, comparing the address of each first group instruction to the target address; and suppressing the result of each first group instruction if the corresponding address of each first group instruction is less than the target address.

6. The method of claim 1 wherein the number of instructions between the short forward branch instruction and the target instruction is a first number, and said suppressing step comprises:

initializing a counter;

counting each first group instruction as the first group instruction passes through the processor pipeline; and suppressing the result of the counted first group instruction if the counter totals less than or equal to the first number.

7. The method of claim 1, and:

for each first group instruction, the steps of:

determining whether the first group instruction comprises an additional short forward branch instruction, the additional short forward branch instruction directing processor control to an additional target instruction in response to satisfying an additional condition; and in response to determining that the first group instruction comprises an additional short forward branch instruction, the steps of:

issuing an additional detection signal representing detection of the additional short forward branch instruction; and issuing an additional condition signal representing whether the additional condition of the additional short forward branch instruction is satisfied or is not satisfied.

8. The method of claim 7 and further comprising the steps of:

receiving into the processor pipeline a second group of instructions of the plurality of sequentially arranged instructions, wherein each second group instruction is sequentially arranged after the additional short forward branch instruction and before the additional target instruction, and is operable for causing a result;

passing each second group instruction fully through the processor pipeline; and suppressing the result of each second group instruction in response to the additional detection signal if the additional condition signal represents that the additional condition of the additional short forward branch is satisfied.

9. The method of claim 8 and further comprising the step of causing the result of the second group instructions arranged before the target address in response to the detection signal and the additional detection signal if the condition signal represents that the condition of the short forward branch is not satisfied and the additional condition signal represents that the additional condition of the additional short forward branch is not satisfied.

10. The method of claim 8 and further comprising the step of causing the result of any second group instructions arranged after the target address in response to the additional detection signal if the additional condition signal represents that the additional condition of the additional short forward branch is not satisfied.

11. The method of claim 8 wherein said step of issuing a detection signal comprises setting a predicate tag bit appended to each first group instruction, and wherein said step of issuing an additional detection signal comprises setting an additional predicate tag bit appended to each second group instruction.

12. The method of claim 11 wherein said step of suppressing the result of each second group instruction comprises suppressing the result of the second group instruction if the additional predicate tag is set and the additional condition signal represents that the additional condition of the additional short forward branch is satisfied.

13. The method of claim 8 wherein each second group instruction has a corresponding address, and said step of suppressing the result of each second group instruction comprises:

in response to the additional detection signal, comparing the address of each second group instruction to the additional target address; and suppressing the result of each second group instruction if the corresponding address of each second group instruction is less than the additional target address.

14. The method of claim 8 wherein the number of instructions between the additional short forward branch instruction and the additional target instruction is a first number, and said step of suppressing the result of each second group instruction comprises:

initializing a counter;

counting each second group instruction as the second group instruction passes through the processor pipeline; and suppressing the result of the counted second group instruction if the counter totals less than or equal to the first number.

15. A processor for processing a plurality of sequentially arranged instructions, said processor comprising:

circuitry for receiving into a processor pipeline an instruction from the plurality of sequentially arranged instructions;

circuitry for determining whether the received instruction comprises a short forward branch instruction, the short forward branch instruction directing processor control to a target instruction in response to satisfying a condition;

in response to determining that the received instruction comprises a short forward branch instruction:
circuitry for issuing a detection signal representing detection of the short forward branch instruction; and
circuitry for issuing a condition signal representing whether the condition of the short forward branch instruction is satisfied or is not satisfied;

circuitry for receiving into the processor pipeline a first group of instructions of the plurality of sequentially arranged instructions, wherein each first group instruction is sequentially arranged after the short forward branch instruction and before the target instruction, and is operable for causing a result;

circuitry for passing each first group instruction fully through the processor pipeline; and circuitry for suppressing the result of each first group instruction in response to the detection signal if the condition signal represents that the condition of the short forward branch is satisfied.

16. The processor of claim 15 and further comprising circuitry for causing the result of the first group instruction in response to the detection signal if the condition signal represents that the condition of the short forward branch is not satisfied.

17. The processor of claim 16 wherein said circuitry for issuing a detection signal comprises circuitry for setting a predicate tag bit appended to each first group instruction.

18. The processor of claim 17 wherein, for each first group instruction:

said circuitry for causing comprises circuitry for causing the result of the first group instruction if the predicate tag is set and the condition signal represents that the condition of the short forward branch is not satisfied; and said circuitry for suppressing comprises circuitry for suppressing the result of the first group instruction if the predicate tag is set and the condition signal represents that the condition of the short forward branch is satisfied.

19. The processor of claim 15 wherein each first group instruction has a corresponding address, and said circuitry for suppressing comprises:

in response to the detection signal, circuitry for comparing the address of each first group instruction to the target address; and circuitry for suppressing the result of each first group instruction if the corresponding address of each first group instruction is less than the target address.

20. The processor of claim 15 wherein the number of instructions between the short forward branch instruction and the target instruction is a first number, and said circuitry for suppressing comprises:

a counter for counting each first group instruction as the first group instruction passes through the processor pipeline; and circuitry for suppressing the result of the counted first group instruction if the counter totals less than or equal to the first number.

21. The processor of claim 15, and further comprising, with respect to each first group instruction:

circuitry for determining whether the first group instruction comprises an additional short forward branch instruction, the additional short forward branch instruction directing processor control to an additional target instruction in response to satisfying an additional condition; and in response to determining that the first group instruction comprises an additional short forward branch instruction:
circuitry for issuing an additional detection signal representing detection of the additional short forward branch instruction; and
circuitry for issuing an additional condition signal representing whether the additional condition of the additional short forward branch instruction is satisfied or is not satisfied.

22. The processor of claim 21 and further comprising:

circuitry for receiving into the processor pipeline a second group of instructions of the plurality of sequentially arranged instructions, wherein each second group instruction is sequentially arranged after the additional short forward branch instruction and before the additional target instruction, and is operable for causing a result;

circuitry for passing each second group instruction fully through the processor pipeline; and circuitry for suppressing the result of each second group instruction in response to the additional detection signal if the additional condition signal represents that the additional condition of the additional short forward branch is satisfied.

23. The processor of claim 22 and further comprising circuitry for causing the result of the second group instructions arranged before the target address in response to the detection signal and the additional detection signal if the condition signal represents that the condition of the short forward branch is not satisfied and the additional condition signal represents that the additional condition of the additional short forward branch is not satisfied.

24. The processor of claim 22 and further comprising circuitry for causing the result of any second group instructions arranged after the target address in response to the additional detection signal if the additional condition signal represents that the additional condition of the additional short forward branch is not satisfied.

25. The processor of claim 22 wherein said circuitry for issuing a detection signal comprises circuitry for setting a predicate tag bit appended to each first group instruction, and wherein said step of issuing an additional detection signal comprises setting an additional predicate tag bit appended to each second group instruction.

26. The processor of claim 25 wherein said circuitry for suppressing the result of each second group instruction comprises circuitry for suppressing the result of the second group instruction if the additional predicate tag is set and the additional condition signal represents that the additional condition of the additional short forward branch is satisfied.

27. The processor of claim 22 wherein each second group instruction has a corresponding address, and said circuitry for suppressing the result of each second group instruction comprises:

in response to the additional detection signal, circuitry for comparing the address of each second group instruction to the additional target address; and circuitry for suppressing the result of each second group instruction if the corresponding address of each second group instruction is less than the additional target address.

28. The processor of claim 22 wherein the number of instructions between the additional short forward branch instruction and the additional target instruction is a first number, and said circuitry for suppressing the result of each second group instruction comprises:

a counter for counting each second group instruction as the second group instruction passes through the processor pipeline; and circuitry for suppressing the result of the counted second group instruction if the counter totals less than or equal to the first number.

29. A microprocessor-based computer system, comprising:

an input device;
a display system;
a main memory; and
a microprocessor, coupled to the input device, display system and main memory, and comprising:

circuitry for receiving into a processor pipeline an instruction from the plurality of sequentially arranged instructions;

circuitry for determining whether the received instruction comprises a short forward branch instruction, the short forward branch instruction directing processor control to a target instruction in response to satisfying a condition;

in response to determining that the received instruction comprises a short forward branch instruction:

circuitry for issuing a detection signal representing detection of the short forward branch instruction; and circuitry for issuing a condition signal representing whether the condition of the short forward branch instruction is satisfied or is not satisfied;

circuitry for receiving into the processor pipeline a first group of instructions of the plurality of sequentially arranged instructions, wherein each first group instruction is sequentially arranged after the short forward branch instruction and before the target instruction, and is operable for causing a result;

circuitry for passing each first group instruction fully through the processor pipeline; and circuitry for suppressing the result of each first group instruction in response to the detection signal if the condition signal represents that the condition of the short forward branch is satisfied.

30. The system of claim 29 wherein the microprocessor further comprises circuitry for causing the result of the first group instruction in response to the detection signal if the condition signal represents that the condition of the short forward branch is not satisfied.

31. The system of claim 29 wherein the microprocessor further comprises, with respect to each first group instruction:

circuitry for determining whether the first group instruction comprises an additional short forward branch instruction, the additional short forward branch instruction directing processor control to an additional target instruction in response to satisfying an additional condition; and in response to determining that the first group instruction comprises an additional short forward branch instruction:

circuitry for issuing an additional detection signal representing detection of the additional short forward branch instruction; and circuitry for issuing an additional condition signal representing whether the additional condition of the additional short forward branch instruction is satisfied or is not satisfied.

32. The processor of claim 31 wherein the microprocessor further comprises:

circuitry for receiving into the processor pipeline a second group of instructions of the plurality of sequentially arranged instructions, wherein each second group instruction is sequentially arranged after the additional short forward branch instruction and before the additional target instruction, and is operable for causing a result;

circuitry for passing each second group instruction fully through the processor pipeline; and circuitry for suppressing the result of each second group instruction in response to the additional detection signal if the additional condition signal represents that the additional condition of the additional short forward branch is satisfied.

33. The system of claim 32 wherein the microprocessor further comprises circuitry for causing the result of the second group instructions arranged before the target address in response to the detection signal and the additional detection signal if the condition signal represents that the condition of the short forward branch is not satisfied and the additional condition signal represents that the additional condition of the additional short forward branch is not satisfied.

34. The system of claim 32 wherein the microprocessor further comprises circuitry for causing the result of any second group instructions arranged after the target address in response to the additional detection signal if the additional condition signal represents that the additional condition of the additional short forward branch is not satisfied.

* * * * *